United States Patent [19]

Scheubel

[11] Patent Number: 5,575,112

[45] Date of Patent: Nov. 19, 1996

[54] METHOD FOR CONTROLLING THE GROWTH OF PLANT ROOTS

[75] Inventor: Gerard Scheubel, Ste-Foy, Canada

[73] Assignee: Texel Inc., Quebec, Canada

[21] Appl. No.: 166,104

[22] Filed: Dec. 14, 1993

Related U.S. Application Data

[63] Continuation-in-part of Ser. No. 727,442, Jul. 9, 1991, abandoned.

[51] Int. Cl.⁶ ........................................ A01G 9/02
[52] U.S. Cl. ............... 47/78; 47/73; 47/9; 47/58
[58] Field of Search ................... 47/58, 66 MD, 47/73 R, 95, 78, 74

[56] References Cited

U.S. PATENT DOCUMENTS

| | | | |
|---|---|---|---|
| 2,202,664 | 5/1940 | Leatherman | 47/73 R |
| 3,938,280 | 2/1976 | Vandemark et al. | 47/9 S |
| 4,299,613 | 11/1981 | Cardarelli | 47/DIG. 10 |
| 4,881,344 | 11/1989 | Frey et al. | 47/74 R |
| 4,884,367 | 12/1989 | Lawton | 47/73 R |
| 4,888,914 | 12/1989 | Reiger | 47/73 R |
| 4,916,857 | 4/1990 | Kinghorn | 47/73 R |
| 5,181,952 | 1/1993 | Burton et al. | 47/9 S |
| 5,393,313 | 2/1995 | Reiger | 47/73 |

FOREIGN PATENT DOCUMENTS

| | | | |
|---|---|---|---|
| 1163596 | 2/1964 | Germany | 47/9 S |
| 3071124 | 3/1988 | Japan | 47/9 S |

*Primary Examiner*—Terry Lee Melius
*Assistant Examiner*—Joanne C. Downs
*Attorney, Agent, or Firm*—Bacon & Thomas

[57] ABSTRACT

Disclosed is a method for controlling and preventing the growth of plant roots using a water-permeable, non-woven fabric made of synthetic fibers coated or otherwise impregnated with a water-insoluble polymeric binder in which is dispersed a water-insoluble inorganic copper compound in an amount effective to stop root growth. The polymeric binder is bound to the fabric and retains and confines the copper compound to the fabric. The coated fabric is used to stop or prevent the growth of undesirable rootlets or radicles which come in contact thereto.

16 Claims, No Drawings

METHOD FOR CONTROLLING THE GROWTH OF PLANT ROOTS

This application is a continuation-in-part of application Ser. No. 07/727,442, filed Jul. 9, 1991, abandoned.

BACKGROUND OF THE INVENTION a) field of the invention

The present invention relates to a method for controlling the growth of plant roots, which makes use of a durable root growth barrier consisting of a nonwoven, water-permeable fabric which has an adequate mechanical strength and is made of synthetic fibers coated with a polymeric binder in which is dispersed an inorganic copper compound in such an effective amount as to stop the growth of roots. The fabric may be used as a sheet, a sleeve or a bag, in order to chemically prune herbaceous or ligneous roots and prevent root spiralling.

b) description of the prior art

Several methods have been developed over the past years in order to control the root growth of nursery stock, trees seedlings or mature trees.

Prior to commenting on these known methods, it is worth noting that nursery trees are usually grown in plastic containers provided with an aperture at their bottom. When the container is untreated, root spiralling may occur within the same while the plant is growing. Some roots may also emerge from the aperture at the bottom of the container. These emerging roots, called "tap roots", usually need to be cut to allow removal of the seedlings from the container. In practice, such a cutting is a great source of loss as a great number of seedlings are lost after transplantation due to the weakness of the damaged tap root.

To tentatively solve this problem, it has already been suggested to apply a coating consisting of a latex paint containing copper carbonate, onto the inner wall surfaces of the containers. By way of example, U.S. Pat. No. 4,916,856 to KINGHORN discloses a tree seedling box made of expanded polystyrene in which a plurality of castellated cavities are molded. Some portions of the surface of each cavity is coated with a copper paint or a latex paint containing copper carbonate, to prune the lateral roots of the tree seedling which come into contact therewith. In this patent, no means whatsoever are provided to prevent the tap roots from emerging from the opened bottom of each cavity. Accordingly, the tap roots must still be cut to allow removal of the seedlings, thereby causing damage to the trees during transplantation. The same occurs with all the types of coated or uncoated seedling boxer, presently known to the Applicant.

It has also been already suggested to replace plastic containers by burlap-type bags made of non-degradable non-woven fabrics. By way of example, U.S. Pat. Nos. 4,574,522 and 5,103,588 to REIGER disclose a method for controlling the root growth of nursery stock planted in the ground, wherein the roots are confined in the ground within a porous fabric container formed of needle punched continuous fibers, which acts as a mechanical barrier and promotes enlarged root nodule formation and root branching. With such a fabric container, part of the roots may spiralize within the container and rootlets may perforate the fabric and grow outside of the container. When transplanting the tree, the rootlets must be cut and transplantation shock is caused to the tree.

To tentatively avoid this problem, European laid-open patent application No. 307,720 to ZIMMERMAN discloses a geotextile membrane intended to be used as a mechanical barrier against plant root growth, in which are incorporated a plurality of slow release herbicide nodules. The herbicide which is released over the time, diffuses within the soil and acts as a root repellant agent. If this method is quite efficient, it does not prevent root spiralling and may generate pollution problems because of the herbicide released into the soil.

Last of all, it has also been suggested in the past to treat non-woven fabric or paper with chemical agents, especially fungicides, in order to prevent a decay of the same when used in a plant nursery. In this connection, reference can be made of U.S. Pat. No. 4,881,344 to FREY et al, which discloses a sleeve for use in plant germination, consisting of a non-woven cellulosic material treated with a polymer in which is dispersed a fungicide which may be an inorganic copper compound such as copper oxychloride, and whose purpose is exclusively to prevent the cellulose fibers from rooting. In this patent, it is disclosed that the sleeve must hold the roots together without, however, constituting an impermeable barrier for the roots. Accordingly, this patent does not call for, and actually teaches away from incorporating an inorganic copper compound into a fabric in such an effective amount as to stop root growth.

SUMMARY OF THE INVENTION

The object of the present invention is to provide a simple yet efficient method for controlling the growth of plants roots, which method permits not only achievement of the requested control, but also avoids the other problem encountered so far, including transplantation shock and root spiralisation, and to create sclerosis of herbaceous plants.

The invention is based on the discovery that, when use is properly made of a durable, porous non biodegradable non-woven barrier of adequate mechanical resistance, coated with an effective amount of water-insoluble copper compound dispersed into a cured water-insoluble polymer matrix, one may achieve:

(a) pruning of tap roots emerging from the bottom of trees seedling boxes; and/or (b) uniform and complete root pruning of nursery trees grown in bags, thereby avoiding spiralling and perforation of the bags by rootlets; and/or (c) sclerosis of herbaceous plants and chemical pruning of roots from trees; and/or (d) pruning of roots penetrating into drainage pipes or disturbing ground-embedded structures such as basement or swimming pool walls; and/or (e) uniform pruning of rootlets of nursery stocks.

Thus, in its broadest aspect, the invention provides a method for controlling the growth of plant roots, which consists in positioning close to the plant roots, a water-permeable, non-woven fabric made of synthetic fibers coated or otherwise impregnated with a water-insoluble polymeric binder in which is dispersed a water-insoluble inorganic copper compound in an amount effective to stop root growth, the binder being bound to the fabric and thus retaining and confining the copper compound to the fabric, whereby, in use, the coated fabric stops the growth of undesirable rootlets or radicles which come in contact thereto.

To achieve the very specific goal (a) listed hereinabove, the invention also provides a method for pruning tap roots emerging from the bottoms of tree-seedling boxes, which comprises the steps of:

(a) providing a root growth barrier consisting of a sheet of a non-woven fabric made of synthetic fibers coated with a water-insoluble polymeric binder in which is dispersed a water-insoluble inorganic copper compound in an amount effective to stop the growth of rootlets or radicles which come in contact with the fabric;

(b) placing the tree-seedling boxes onto this barrier so that the bottoms of the boxes are in direct contact with the barrier; and (c) keeping the tree-seedling boxes on the barrier until the seedlings are ready to be removed from the boxes for transplantation;

whereby the tap roots emerging from the bottoms of the boxes during growth of the trees within the boxes are pruned by the barrier and thus need not be cut when the seedling are removed from the boxes for transplantation, thereby avoiding transplantation shock.

To achieve the other specific goal (b) listed hereinabove, the invention further provides a method for pruning roots of nursery trees grown in bags, which method comprises the steps of:

(a) providing bags of a water-permeable, non-woven fabric made of synthetic fibers coated with a water-insoluble polymeric binder in which is dispersed a water-insoluble inorganic copper compound in an amount effective to stop root growth; and (b) using the bags of step (a) as said bags to grow the nursery trees, whereby the roots of the nursery trees grown in these bags are uniformly and completely pruned as soon as they contact the coated fabric, thereby avoiding roots spiralisation and transplantation shock.

To achieve the very specific goal (c) listed hereinabove, the invention still provides a method for controlling weed growth and preventing root emergence in a soil covered with a sheet of a landscape fabric, the method comprising the steps of:

(a) providing a weed growth and root emergence barrier consisting of a sheet of non-woven fabric made of synthetic fibers coated with a water-insoluble polymer binder in which is dispersed a water-insoluble inorganic copper compound in an amount effective to stop root growth; and (b) using the barrier of step (a) as said sheet of a landscape fabric;

whereby weed seeds carried onto said sheet of a landscape fabric by the wind or by irrigation water or roots emerging from the soil are prevented from growing, thereby avoiding hand-weeding or herbicide application, and perforation of the fabric.

To achieve the very specific goal (d) listed hereinabove, the invention further provides a method for controlling the growth of roots in order to prevent a structure mounted on or within the soil, such as a drainage pipe, a sidewalk or a wall, from being damaged with roots, which method comprises the step of positioning onto the external surface the structure to be protected a root barrier consisting of a sheet of a non-woven fabric made of synthetic fibers coated with a water-insoluble polymeric binder in which is dispersed a water-insoluble inorganic copper compound in an amount effective to stop the growth of rootlets or radicles which come in contact with the fabric.

Last of all, to achieve the very specific goal (e) listed hereinabove, the invention still further provides a method of controlling the growth of plant roots, said method consisting in growing the plants in closed-bottomed cavities made in a rigid, water-permeable, non-woven fabric made of synthetic fibers coated or otherwise impregnated with a water-insoluble polymeric binder in which is dispersed a water-insoluble inorganic copper compound in an amount effective to stop root growth, the binder being bound to the fabric and thus retaining and confining the copper compound to the fabric, whereby, in use, the coated fabric stops the growth of undesirable rootlets or radicles which come in contact thereto.

In this particular method, the barrier sheet can be wrapped as a sleeve around the drainage pipe to be protected, or placed vertically or otherwise in a trench made adjacent the structure to be protected, such as a sidewalk, or a swimming pool wall.

DETAILED DESCRIPTION OF THE INVENTION

In order to efficiently carry out any one of the above mentioned methods, use must be made of a non-woven barrier which is manufactured from synthetic fibers of filaments which preferably have a size of 1 to 17 dtex and are made of a water-insoluble polymer selected from the group consisting of polypropylene, polyester, polyethylene and polyamide. These fibers do not rot in or above the soil. The fibers or filaments may contain 1 to 2% of black carbon in order to increase the ultraviolet resistance of the fabric. The fabric is manufactured by entangling these fibers or filaments as is known per se, by needlepunching, thermal bonding, calendering and/or chemical bonding. The mechanical resistance that is required for each specific application can be achieved by varying the amount of interlocked fibers. In practice, the average weight of the fabric may vary from 10 $g/m^2$ to 800 $g/m^2$ and the pore size of the fibrous structure may vary from 30 to 180 microns.

In accordance with the present invention, the fabric acts as a support for a water-insoluble copper compound present in such an effective amount as to control the growth of roots. In practice, use can be made of 5 to 80 g of water insoluble copper compound per $m^2$ of fabric to achieve the required control. Preferably, the water-insoluble copper compound is in powder form and selected from the group consisting of copper oxychloride, copper oxide, copper carbonate and copper hydroxide. The particle size of the compound in powder form is preferably in the range of 0.5 to 2 microns. Suitable copper compounds meeting the above requirements are commercialized by GRIFFIN CORP. under the trademarks KOCIDE 101 or SPIN OUT FP. These compounds contain proprietary ingredients enhancing the dispersion and activity of the basic copper compound, which is preferably copper hydroxide. As aforesaid, the copper compound acts as a growth regulator by chemically pruning the rootlets and radicles that come in contact with it.

In order to hold this active compound on the fabric, use is made of a water insoluble polymeric binder which is preferably obtained by drying and curing a latex selected from the group consisting of acrylate, methacrylate, styrene acrylate and polyvinylchloride, in which the copper compound is dispersed. The most desirable binders are self cross-linking acrylate or styrene acrylate. The polymeric binder can be used with a cross-linking catalyst such as melamine.

In practice, it has been found that the degree of cross-linking is of great importance to encapsulate the copper compound powder and thus obtain a good water-swelling resistance and a good water-permeability. This degree can be achieved by drying and curing the binder containing the dispersed copper compound at 140° to 170° for 1 to 5 minutes.

The polymer binder is preferably used in an amount ranging from 5 to 400 g per m$^2$ of fabric and can be applied by any method known per se, such as by knife coating, printing, soaking or spraying in order to create a uniform layer of applied binder either on one side of the fabric or through the thickness of the same. The method and quantity to be applied on the non-woven fabric depends upon the use of the finished product.

The following examples illustrate the invention and will allow those skilled in the art to understand it more clearly. It should be understood, however, that the invention is not limited solely to the examples given below.

carried by the wind or irrigation water, on the protection mulch applied onto the fabric. One of the tested fabrics was the same as described before. The other one was a 50 g/m$^2$ high modulus spunbonded fabric made from polypropylene continuous filaments of 6 dtx and coated with the same binder and copper compound as the previous product, applied in the same amount per square meter and then dried and cured under equivalent conditions.

These two fabrics called E and F in the following Table were compared to commercially available landscape fabrics called A, B, C and D in the Table, by determining the numbers of perforation obtained with 5 different types of weeds grown on top of this surface.

| Fabric | *Ambrosia Artemesifolia* | *Brassica Kaber* | *Chenopodium Album* | *Setiria Glauca* | *Vicia Cracca* |
| --- | --- | --- | --- | --- | --- |
| A Spunbonded 90 g/m$^2$ | 20 | 31 | 56 | 48 | 5 |
| B Spunbonded 70 g/m$^2$ | 20 | 19 | 48 | 20 | 7 |
| C Needlepunched 130 g/m$^2$ | 24 | 28 | 48 | 52 | 15 |
| D Spunbonded 50 g/m$^2$ | 11 | 13 | 40 | 36 | 13 |
| E Needlepunched 125 g/m$^2$ fabric with copper compound | 1 | 0 | 0 | 4 | 0 |
| F Spunbonded 50 g/m$^2$ fabric with copper compound | 3 | 0 | 0 | 1 | 1 |
| G Number of weeds originally spreaded | 25 | 42 | 48 | 59 | 27 |

EXAMPLE 1

A needlepunched non-woven fabric was made from 125 g/m$^2$ polypropylene 5 dtex fibers of a staple length of 100 mm. The fabric was heat-calendered to achieve a pore size of about 65 microns (as measured by the bubble point method). Then, the fabric was coated on one side with a mixture of self-crosslinking acrylic binder with copper hydroxide applied with a knife coating device unit. The application was made to obtain a dry weight of 25 g of acrylic binder and 12 g of copper hydroxide per m$^2$ of fabric. The coated fabric was dried, cured and crosslinked at 150° C. for 3 minutes.

Three sheets of two meters wide finished fabric were sewn lengthwise to achieve a wide continuous product. The product was unrolled over the soil and pine tree seedling boxes were placed during two growing seasons directly over the fabric. The tap roots were pruned and the seedlings could then be removed without having to cut the tap roots. The costs saved by avoiding this operation were equal to 30% of the seedling value.

Thus, direct pruning over a barrier according to the invention may replace the conventional air pruning achieved by placing the seed boxes over expensive growing tables, which are no longer needed.

EXAMPLE 2

Two landscape fabrics according to the invention were tested against perforation of weeds growing from soil below it and also against perforation of weeds growing from seeds The fabrics coated with a copper compound E and F created a sclerosis of the weeds and avoided perforation, whereas the common landscape fabrics A to D did not act as barriers to the down-growing weeds. Their roots penetrated the underlying fabrics and began to grow in the soil. Then, rapid growth of the weeds was observed. This, in practice, may necessitate costly hand weeding or herbicide application. Moreover, if weeds are removed or killed when young, the fabric may be torn when the weeds are pulled out.

EXAMPLE 3

A non-woven fabric of the type described in example I was sewn in a bag form by making a sleeve of 25 cm in diameter with a bottom sewn at a depth of 25 cm. Each bag was filled with soil and a small tree. The bags were placed above and within the soil for growth during one year. The same species were placed in plastic containers of the same dimension.

As is shown in the following Table, the trees grown in the treated bags according to the invention showed a more fibrous root system allowing better water and nutrient absorption. Such was reflected by an increase in the layer trunk size. Spiralizing was also avoided, which is quite interesting as spiraling is known to inhibit good root branching and to lead to growth delay after transplantation.

| | Size of trunk (mm) | | Roots dry weight (g) | | Spiraling | |
|---|---|---|---|---|---|---|
| Species | Container | Treated bag | Container | Treated bag | Container | Treated bag |
| *Malus Floribunda* | 26 | 33 | 680 | 890 | Yes | No |

EXAMPLE 4

A non-woven fabric weighing 100 g/m² was manufactured by needlepunching 3.3 dtex polyester fibers at 300 penetrations per square centimeter. The fabric was dipped in a mixture devised to provide 60 g/m² of self cross-linking acrylic resin and 15 g/m² of copper hydroxide compound. The impregnated fabric was squeezed with a padder, dried, cured and cross-linked at 180° C. for 2 minutes. The fabric was cut to be 38 centimeters-wide.

The product was wrapped as a sleeve of 11 centimeters in diameter around a drainage pipe of 10 centimeters in diameter by sewing or welding with an ultrasonic device. The fabric protected pipe was then buried in the soil for drainage purpose.

The roots growing from trees located in the neighbourhood of the pipe were pruned when they touched the fabric. This protection avoided the penetration of roots into the drainage pipe, thereby avoiding plugging of the pipe.

EXAMPLE 5

A non-woven fabric weighing 30 g/m² was manufactured by needlepunching 6 dtex polyester fibers at 350 penetrations per square centimeter. The product was fully impregnated with a mixture of 200 g/m² of self cross-linking acrylic resin and 60 g/m² of a copper hydroxide and squeezed with a padder. The impregnated product was dried, cured and cross-linked at 180° C. for 4 minutes. After cooling, the impregnated fabric was in the form of a semi rigid soil.

A piece of this fabric of 50 centimeters in width, was placed vertically in a 50 centimeter-deep trench dug in the soil along a sidewalk. The trench was then filled with soil. The roots growing from trees or plants located near the sidewalk or the structure to be protected were pruned when touching the fabric.

As can be appreciated, the very same method could be used to protect bigger structures, such as basement walls or swimming pool walls. In such a case, the trench may be up to 5 feet deep.

EXAMPLE 6

A non-woven fabric weighing 300 g/m² was manufactured by needlepunching a blend of 50% 6 dtex polyester fibers and 50% 3.3 dtex copolyester fibers at 300 penetrations per square centimeter. The fabric was heat set and calendered at 400° C. in order to achieve a semi-rigid sheet. Then, the fabric was coated on one side with a mixture of self cross-linking acrylic resin and of a copper hydroxide compound in the same manner as described in example 1.

The sheet was heat embossed using a heated press in order to produce a rigid seedling box of 50 centimeters long and 25 centimeters wide containing 18 cavities of 7 centimeters in depth and 7,5 centimeters in diameter. Plant seedlings were placed into the cavities with soil and the boxes were placed on the soil. The rootlets were pruned equally everywhere on the vertical and horizontal wall and easy transplanting was obtained after the seedling growing period.

What is claimed is:

1. A method for controlling weed growth in a soil covered with a sheet of a landscape fabric, said method comprising the steps of:
   a) providing a weed growth barrier comprising a sheet of non-woven fabric made of synthetic fibers coated with a polymeric binder in which is dispersed an effective amount of a water-insoluble inorganic copper compound to stop root growth wherein, in step (a):
   the synthetic fibers are made of a non-rotting polymer selected from the group consisting of polypropylene, polyester, polyethylene and polyamide, and have a size of 1 to 17 dtex;
   the non-woven fabric has an average weight of 10 to 800 g/m² and is manufactured by entangling the synthetic fibers by needle punching, thermal bonding, calendaring or chemical bonding;
   said non-woven fabric is water-permeable and has pores of 30 to 180 microns;
   the water-insoluble copper compound is selected from the group consisting of copper oxychloride, copper oxide, copper carbonate and copper hydroxide and is in the form of a powder having a particle size ranging from 0.5 to 2 microns;
   said water-insoluble copper compound is used in an amount ranging from 5 to 80 g/m² of said fabric; and
   from 5 to 400 g/m² of said polymeric binder is applied onto the fibers by knife coating, printing, soaking or spraying, so as to produce a uniform coating, and is subjected to drying, curing and cross-linking at a temperature of 140° C. to 170° C. for 1 to 5 minutes so as to entrap the water-insoluble copper compound powder and give the binder a good water-swelling resistance; and
   b) using the barrier of step (a) as said sheet of a landscape fabric; whereby weed seeds carried onto said sheet of a landscape fabric by the wind or by irrigation water are prevented from growing, thereby avoiding hand-weeding or herbicide application and perforation of the landscape fabric.

2. The method of claim 1, wherein step (a) comprises providing a weed growth barrier comprising a sheet of non-woven fabric made of synthetic fibers coated with a polymeric binder wherein the polymeric binder is selected from the group consisting of self-crosslinking acrylate or styrene acrylate.

3. The method of claim 1, wherein step (a) comprises providing a weed growth barrier comprising a sheet of non-woven fabric made of synthetic fibers coated with a polymeric binder including a cross-linking catalyst.

4. The method of claim 1, wherein step (a) comprises providing a weed growth barrier comprising a sheet of non-woven fabric made of synthetic fibers coated with a polymeric binder, in which is dispersed an effective amount of a water-insoluble inorganic copper compound to stop root growth, wherein:

the synthetic fibers are made of polypropylene and have a size of about 5 dtex and a staple length of about 100 mm;

the non-woven fabric has an average weight of about 125 g/m² and is manufactured by needle punching;

said non-woven fabric has pores of about 65 microns;

the water-insoluble inorganic copper compound is copper hydroxide;

said copper hydroxide is used in an amount of about 12 g/m² of the non-woven fabric;

the polymeric binder is a self-cross-linking acrylic binder; and about 25 g/m² of said self-cross-linking acrylic binder is applied as a coating onto one side of the non-woven fabric by knife coating, and is subjected to drying, curing and cross-linking at 150° C. for 3 minutes.

5. The method of claim 1, wherein step (a) comprises providing a weed growth barrier comprising a sheet of non-woven fabric made of synthetic fibers coated with a polymeric binder, in which is dispersed an effective amount of a water-insoluble inorganic copper compound to stop root growth, wherein:

the synthetic fibers are made of continuous filaments of polypropylene of about 6 dtex;

the non-woven fabric has an average weight of about 50 g/m² and is manufactured by calendaring;

the water-insoluble inorganic copper compound is copper hydroxide;

said copper hydroxide is used in an amount of about 12 g/m² of the non-woven fabric;

the polymeric binder is a self-cross-linking acrylic binder; and about 25 g/m² of said self-cross-linking acrylic binder is applied as a coating onto one side of the non-woven fabric by knife coating, and is subjected to drying, curing and cross-linking at 150° C. for 3 minutes.

6. A method for pruning tap roots emerging from bottoms of, tree-seedling boxes, said method comprising the steps of:

(a) providing a root growth barrier comprising a sheet of a non-woven fabric made of synthetic fibers coated with a polymeric binder in which is dispersed an effective amount of a water-insoluble inorganic copper compound to stop root growth wherein the synthetic fibers are made of a non-rotting polymer selected from the group consisting of polypropylene, polyester, polyethylene and polyamide, and have a size of 1 to 17 dtex;

the non-woven fabric has an average weight of 10 to 800 g/m² and is manufactured by entangling the synthetic fibers by needle punching, thermal bonding, calendaring or chemical bonding;

the non-woven fabric is water-permeable and has pores of 30 to 180 microns;

the water-insoluble copper compound is selected from the group consisting of copper oxychloride, copper oxide, copper carbonate and copper hydroxide and is in the form of a powder having a particle size ranging from 0.5 to 2 microns;

the water-insoluble copper compound is used in an amount ranging from 5 to 80 g/m² of the non-woven fabric;

from 5 to 400 g/m² of said polymeric binder is applied onto the fibers by knife coating, printing, soaking or spraying, so as to produce a uniform coating, and is subjected to drying, curing and cross-linking at a temperature of 140° C. to 170° C. for 1 to 5 minutes so as to entrap the water-insoluble copper compound powder and give the binder a good water-swelling resistance;

(b) placing said tree-seedling boxes onto said barrier so that the bottoms of said boxes are in direct contact with said barrier; and (c) keeping said tree-seedling boxes on said barrier until the seedlings are ready to be removed from the boxes for transplantation, whereby the tap roots emerging from the bottoms of the boxes during growth of the tree-seedlings within said boxes are pruned by said barrier and thus need not be cut when the tree-seedlings are removed from the boxes for transplantation, thereby avoiding transplantation shock.

7. The method of claim 6, wherein step (a) comprises providing a root growth barrier comprising a sheet of a non-woven fabric made of synthetic fibers coated with a polymeric binder, wherein the polymeric binder is selected from the group consisting of self-cross-linking acrylate or styrene acrylate.

8. The method of claim 6, wherein step (a) comprises providing a root growth barrier comprising a sheet of a non-woven fabric made of synthetic fibers coated with a polymeric binder including a cross-linking catalyst.

9. The method of claim 6, wherein step (a) comprises providing a root growth barrier comprising a sheet of a non-woven fabric made of synthetic fibers coated with a polymeric binder, in which is dispersed an effective amount of a water-insoluble inorganic copper compound to stop root growth, wherein;

the synthetic fibers are made of polypropylene and have a size of about 5 dtex and a staple length of about 100 mm;

the non-woven fabric has an average weight of about 125 g/m² and is manufactured by needle punching;

the non-woven fabric has pores of about 65 microns;

the water-insoluble copper compound is copper hydroxide and is used in an amount of about 12 g/m² of the non-woven fabric;

the polymeric binder is a self-cross-linking acrylic binder; and about 25 g/m² of said self-cross-linking acrylic binder is applied as a coating onto one side of the non-woven fabric by knife coating, and is subjected to drying, curing and cross-linking at 150° C. for 3 minutes.

10. A method for pruning roots of nursery trees grown in bags, said method comprising the steps of:

(a) providing bags of a water-permeable, non-woven fabric made of synthetic fibers coated with a polymeric binder in which is dispersed an effective amount of a water-insoluble inorganic copper compound to stop root growth, wherein the synthetic fibers are made of a non-rotting polymer selected from the group consisting of polypropylene, polyester, polyethylene and polyamide and have a size of 1 to 17 dtex;

the non-woven fabric has an average weight of 10 to 800 g/m² and is manufactured by entangling the synthetic fibers by needle punching, thermal bonding, calendaring or chemical bonding;

the non-woven fabric is water-permeable and has pores of 30 to 180 microns;

the water-insoluble copper compound is selected from the group consisting of copper oxychloride, copper oxide, copper carbonate and copper hydroxide, is in the form of a powder having a particle size ranging from 0.5 to 2 microns and is used in an amount ranging from 5 to 80 g/m² of the non-woven fabric; from 5 to 400 g/m² of said polymeric binder is applied onto the fibers by knife coating, printing, soaking or spraying, so as to produce a uniform coating, and is subjected to drying, curing and cross-linking at a temperature of 140° C. to 170° C. for 1 to 5 minutes so as to entrap the water-insoluble copper compound and give the binder a good water-swelling resistance; and (b) using the bags of step (a) to grow said nursery trees, whereby roots of the nursery trees grown in said bags are uniformly and completely pruned as soon as they contact the coated fabric, thereby avoiding root spiralisation and transplantation shock.

11. The method of claim 10, wherein step (a) comprises providing bags of a water-permeable non-woven fabric made of synthetic fibers coated with a polymeric binder, wherein the polymeric binder is selected from the group consisting of self-cross-linking acrylate or styrene acrylate.

12. The method of claim 10, wherein step (a) comprises providing bags of a water-permeable, non-woven fabric made of synthetic fibers coated with a polymeric binder including a cross-linking catalyst.

13. The method of claim 10, wherein step (a) comprises providing bags of a water-permeable, non-woven fabric made of synthetic fibers coated with a polymeric binder in which is dispersed an effective amount of a water-insoluble inorganic copper compound to stop root growth, wherein:
the synthetic fibers are made of polypropylene and have a size of about 5 dtex and a staple length of about 100 mm;
the non-woven fabric has an average weight of about 125 g/m² and is manufactured by needle punching;
the non-woven fabric has pores of about 65 microns;
the water-insoluble copper compound is copper hydroxide and is used in an amount of about 12 g/m² of the non-woven fabric;
the polymeric binder is a self-cross-linking acrylic binder; and
about 25 g/m² of said self-cross-linking acrylic binder is applied as a coating onto one side of the non-woven fabric by knife coating, and is subjected to drying, curing and cross-linking at 150° C. for 3 minutes.

14. A method for controlling growth of roots in order to prevent a structure mounted on or within soil, such as a drainage pipe, a sidewalk or a wall, from being damaged with roots, said method comprising the step of positioning onto an external surface of the structure to be protected a root barrier comprising a sheet of a non-woven fabric made of synthetic fibers coated with a polymeric binder in which is dispersed a water-insoluble inorganic copper compound in an amount effective to stop growth of rootlets or radicles which come in contact with the non-woven fabric, wherein
the synthetic fibers are made of a non-rotting polymer selected from the group consisting of polypropylene, polyester, polyethylene and polyamide and have a size of 1 to 17 dtex;
the non-woven fabric has an average weight of 10 to 800 g/m² and is manufactured by entangling the synthetic fibers by needle punching, thermal bonding, calendaring or chemical bonding;
the non-woven fabric is water-permeable and has pores of 30 to 180 microns;
the water-insoluble copper compound is selected from the group consisting of copper oxychloride, copper oxide, copper carbonate and copper hydroxide and is in the form of a powder having a particle size ranging from 0.5 to 2 microns;
the water-insoluble copper compound is used in an amount ranging from 5 to 80 g/m² of the non-woven fabric; and
from 5 to 400 g/m² of said polymeric binder is applied onto the fibers by knife coating, printing, soaking or spraying, so as to produce a uniform coating, and is subjected to drying, curing and cross-linking at a temperature of 140° C. to 170° C. for 1 to 5 minutes so as to entrap the water-insoluble copper compound powder and give the binder a good water-swelling resistance.

15. The method of claim 14, wherein the step of positioning a root barrier comprises positioning a root barrier comprising a sheet of a non-woven fabric made of synthetic fibers coated with a polymeric binder selected from the group consisting of self-cross-linking acrylate or styrene acrylate.

16. The method of claim 14, wherein the step of positioning a root barrier comprises positioning a root barrier comprising a sheet of a non-woven fabric made of synthetic fibers coated with a polymeric binder including a cross-linking catalyst.

* * * * *